(No Model.)
W. G. SCOTT & H. CAMPBELL.
SCREEN FOR THRASHING MACHINES.
No. 286,853. Patented Oct. 16, 1883.
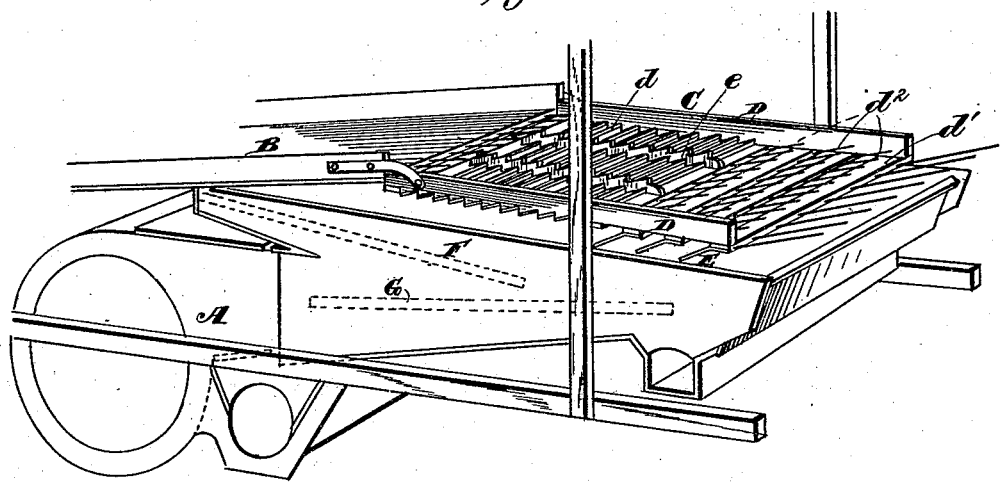
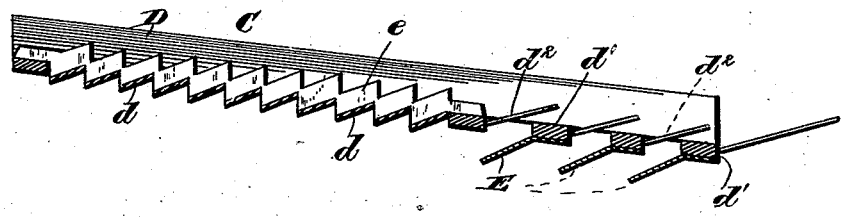
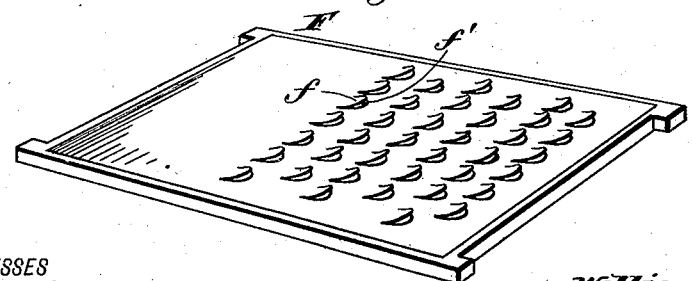
WITNESSES
INVENTORS.
William G. Scott,
Howard Campbell,
By James L. Norrie.
Attorney

UNITED STATES PATENT OFFICE.

WILLIAM G. SCOTT AND HOWARD CAMPBELL, OF RICHMOND, INDIANA.

SCREEN FOR THRASHING-MACHINES.

SPECIFICATION forming part of Letters Patent No. 286,853, dated October 16, 1883.

Application filed August 9, 1883. (No model.)

*To all whom it may concern:*

Be it known that we, WILLIAM G. SCOTT and HOWARD CAMPBELL, citizens of the United States, residing at Richmond, Wayne county, Indiana, have invented new and useful Improvements in Screens for Thrashing-Machines, of which the following is a specification.

The object of this invention is to provide devices for cleaning grain in a thrashing-machine, and more especially for preventing short straws and white-caps from passing into clean grain.

The invention consists in certain novel constructions and combinations of parts, which will be hereinafter described, and then pointed out in the claims.

Referring to the drawings, Figure 1 is a perspective showing a portion of the thrashing mechanism with the riddles attached. Fig. 2 is a central longitudinal section of the upper chaffing-riddle detached. Fig. 3 is a perspective of the lower or lipped riddle.

A in said drawings indicates a portion of the frame of the thrasher, containing the fan-chamber, the grain-spout and the tailing-spout, and the conveyer. These parts do not essentially differ in construction from apparatus heretofore used.

To the tail of the conveyer B is attached a chaffing-riddle, C, which is of the following construction: To the side bars, D D, are attached transverse slats $d$, which extend from one end of said bars to a point not far from their middle, the slats having such an inclination as to permit the short straw or chaff to pass toward the tail-board and allow the grain to drop between them upon the sieves beneath. From the point where the slats terminate cross-bars $d'$ are attached at intervals to the side bars, and to each cross-bar is secured a plate, E, extending from side to side of the riddle, and inclined downward and rearward, or toward the grain-chutes, said plates projecting below the bottom of the riddle, as shown in Fig. 2. The function of these plates is to deflect the air driven by the fan, which would otherwise pass beneath the riddle C, and deflect it upward through the wire openings, concentrating the blast upon these points and under the other division of the riddle, and driving the short straws and other substances, which would otherwise mingle with the grain, over the tail-board. Each cross-bar $d'$ is provided with wires $d^2$, extending upward and forward over the transverse openings between the cross-bars.

Beneath the chaffing-riddle C is arranged a riddle, F, formed of sheet metal or other suitable material, and having throughout its surface and at suitable intervals semicircular or semi-elliptic cuts made through the sheet metal, the tongue $f$ thus formed being bent upward, as shown in Fig. 3, in such manner as to cover or overhang the opening $f'$, but exposing it around the edges of the tongue-piece $f$. This lower riddle is hung so as to receive the grain from the wire openings between the conveyer and the chaffing-riddle C, as well as whatever may pass through the slatted division of the latter. The peculiar construction of the riddle F, having the raised lips $f$ overhanging the openings $f'$, enables it to arrest the short straws, heads of grain, and other foreign substances which fall from the upper riddle, and the blast from the fan passing up through the openings $f'$ keeps them clear and presses the foreign matter toward the tailing-chute, thus preventing it from mingling with the grain.

A third riddle, G, may be placed below the sheet-metal riddle F, if desired.

Notched bars $e\ e$ may be attached to the slats $d$ of the chaffing-riddle C, said parts having the usual construction and function.

No special actuating mechanism is illustrated in the drawings, as the invention does not differ in such respects from the apparatus in common use.

Having thus described our invention, what we claim is—

1. In a grain-separator, the chaffing-riddle composed of the side bars, D, combined with the transverse slats $d$, forming one division of the riddle, and the cross-bars $d'$, having rigidly attached thereto the downwardly and rearwardly extending plates E and the upwardly and forwardly extending wires $d^2$, forming another division of the riddle, whereby the air-blast is concentrated under the two divisions and the short straws are driven over the tail-board, substantially as described.

3. The chaffing-riddle composed of the transverse slats and the cross-bars having the upwardly-extending wires and downwardly-extending deflecting-plates, in combination with the riddle located beneath the chaffing-riddle and having openings provided with upwardly-overhanging lips, substantially as described.

In testimony whereof we have hereunto set our hands in the presence of two subscribing witnesses.

WM. G. SCOTT.
HOWARD CAMPBELL.

Witnesses:
E. H. DENNIS,
W. W. GAAR.